United States Patent

Mischler

[11] Patent Number: 6,116,396
[45] Date of Patent: Sep. 12, 2000

[54] PRESSURE PLATE SUBASSEMBLY

[75] Inventor: Manfred Mischler, Troy, Mich.

[73] Assignee: Mannesmann Sachs AG, Schweinfurt, Germany

[21] Appl. No.: 09/216,137

[22] Filed: Dec. 18, 1998

[30] Foreign Application Priority Data

Dec. 19, 1997 [DE] Germany .......................... 197 56 726

[51] Int. Cl.⁷ .............................. F16D 13/54; F16D 11/00
[52] U.S. Cl. .................................. 192/70.25; 192/111 A; 192/30 W; 192/70.27
[58] Field of Search .............................. 192/70.25, 30 W, 192/111 A, 70.11

[56] References Cited

U.S. PATENT DOCUMENTS

| | | | |
|---|---|---|---|
| 5,791,448 | 8/1998 | Gochenour et al. | 192/70.25 |
| 5,836,433 | 11/1998 | Uehara | 192/70.25 |
| 5,867,689 | 3/1999 | Young | 192/70.25 |
| 5,911,293 | 6/1999 | Weiss et al. | 192/70.25 |
| 5,921,365 | 7/1999 | Bayer | 192/111 A |
| 5,927,458 | 7/1999 | Weiss et al. | 192/70.25 |

FOREIGN PATENT DOCUMENTS

| | | | |
|---|---|---|---|
| 0 851 136 | 10/1997 | European Pat. Off. | F16D 13/75 |
| 43 06 688 | 11/1993 | Germany | F16D 13/75 |
| 195 19 863 | 12/1995 | Germany | F16D 13/70 |
| 2 311 102 | 9/1997 | United Kingdom | F16D 13/75 |
| 2 327 719 | 2/1999 | United Kingdom | F16D 13/75 |

Primary Examiner—Rodney H. Bonck
Assistant Examiner—Tisha D. Waddell
Attorney, Agent, or Firm—Cohen, Pontani, Lieberman & Pavane

[57] ABSTRACT

A pressure plate sub assembly for urging a clutch disk against a flywheel in a friction clutch with automatic wear compensation includes a housing having a radially outer area connectable to the flywheel for rotating with the flywheel about an axis of rotation a pressure plate assembly mounted in the housing for rotation about the axis rotation and axial displacement with respect to the housing, a force accumulator mounted between the housing and the pressure plate for urging the pressure plate against the clutch disk, a wear readjusting device arranged between the accumulator and the pressure plate for compensating for wear of the clutch disk, and a clearance transmitter including a ring element with a wear registering device for registering wear of the friction clutch, a retaining arrrangement for retaining the ring element on the pressure plate sub assembly, and a readjusting arrangement for cooperating with the wear readjusting device.

36 Claims, 7 Drawing Sheets

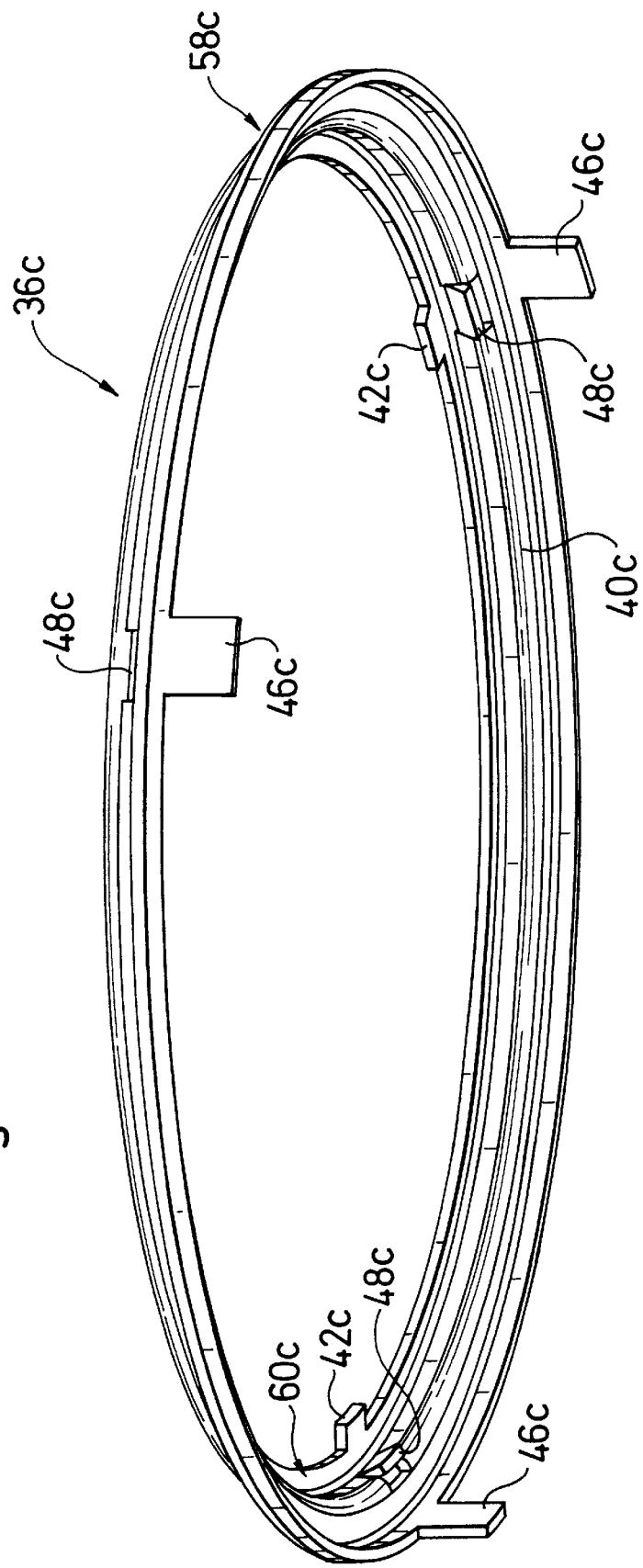

PRESSURE PLATE SUBASSEMBLY

BACKGROUND OF THE INVENTION

1. Field of the Invention

The present invention relates to a pressure plate subassembly for a motor vehicle friction clutch with automatic wear compensation. The pressure plate subassembly includes a housing, which is connectable to a flywheel for joint rotation about an axis of rotation, a pressure plate, arranged in a rotationally fixed and axially displaceable manner in the housing, a force accumulator supported on one side on the housing and on the other side on the pressure plate for pressing the pressure plate toward a side of the housing that is connectable to the flywheel, a wear readjusting device arranged in the support path of the force store having at least one readjusting element that is displaceable for wear compensation and is preferably biased toward a wear-readjusting direction, and at least one clearance transmitter arrangement to register wear of friction linings of a clutch disk of the friction clutch that can be clamped or is clamped between the pressure plate and the flywheel, wherein the clearance transmitter has a readjusting arrangement to cooperate with the wear readjusting device.

2. Description of the Related Art

A prior art pressure plate subassembly of this type is known, for example from reference DE 43 06 688 A1. In this known pressure plate subassembly, an axial bore is provided in the pressure plate for a clearance transmitter which passes through said axial bore with a wear registering section with movement clearance. The wear registering section has a first end and a second end. The first end of the wear registering section is designed to engage on a flywheel and the second end of the wear registering section is fitted with a lever section. The clearance transmitter cooperates with a wear readjusting device for the compensation of wear occurring during operation of the friction clutch. The clearance transmitter is tilted in the axial bore by a spring, and is thus pressed into a frictional clamping seat in this bore. An axial loading of the lever section cooperating with the readjusting device as a result of the readjusting device being biased in the wear readjusting direction does not lead to the clearance transmitter being axially displaced by the readjusting device. Thus an undesired axial expansion of the wear readjusting device is not produced.

The pressure plate is displaced toward the flywheel when wear occurs during operation because of the reduction in thickness of the clutch disk. In so doing, the wear registering section abuts the flywheel and is thereby displaced by the spring in the axial bore counter to the biasing action, so that during a subsequent disengaging operation the wear readjusting device can expand axially until it abuts the lever section once more.

A problem with this known pressure plate sub-assembly is that the clearance transmitter is severely influenced by centrifugal force, with the result that the displacement characteristic or the operating characteristic may change with the centrifugal force so that the operating characteristics of the clearance transmitter is dependent upon the rotational speed of the engine.

SUMMARY OF THE INVENTION

It is the object of the present invention to provide a pressure plate subassembly which has a constant operating characteristic, independent of external influences, and is of simple construction.

According to the invention, this object is achieved by a pressure plate subassembly for a motor vehicle friction clutch with automatic wear compensation, including a housing which is connectable to a flywheel for joint rotation about an axis of rotation, a pressure plate arranged in a rotationally fixed manner and axially displaceable in the housing, a force accumulator, such as a diaphragm spring, that has a first side supported on the housing and a second side supported on the pressure plate and presses the pressure plate toward a side of the housing that is connectable to the flywheel, a wear readjusting device arranged in the support part of the force accumulator that is preferably biased in a wear-readjusting direction and has at least one readjusting element that can be displaced for wear compensation, and at least one clearance transmitter arrangement having a readjusting arrangement to cooperate with the wear readjusting device to register wear of friction linings of a clutch disk that can be clamped or is clamped between the pressure plate and the flywheel.

The clearance transmitter of the pressure plate subassembly according to the invention comprises a ring element which engages frictionally and/or positively on a component of the pressure plate subassembly or at least a constructional element firmly connected to the component. When wear occurs, the clearance transmitter is displaced with respect to the component of the pressure plate subassembly which it frictionally and/or postively engages. The force accumulator is supported on the component with the interposition of the wear readjusting device. The ring element is connected with the readjusting arrangement for cooperating with the wear readjusting device and further includes a wear-registering arrangement for registering the wear by interacting with a further component of the pressure plate subassembly or at least one constructional element firmly connected to the further component.

Since the clearance transmitter arrangement of the present invention comprises a ring element, that is to say the clearance transmitter arrangement is designed with high rotational symmetry, the problems associated with the influence of centrifugal force that occur in clearance transmitters of the prior art that are arranged at specific peripheral regions is eliminated. The centrifugal force components acting on the ring element mutually compensate each other.

According to the invention, the readjusting arrangement has at least one readjusting section that extends away from the ring element and engages the wear readjusting device.

To avoid a non-uniform force effect between the readjusting arrangement and the wear readjusting device, the readjusting arrangement has a plurality of readjusting sections. A preferred embodiment comprises at least three readjusting sections.

The non-uniform force effect is further avoided by arranging the plural readjusting sections at equal spacing from each other in the circumferential direction.

In an embodiment that is particularly simple to construct and acts reliably, the wear readjusting device comprises at least one wear readjusting ring. In this case, the at least one readjusting section of the readjusting arrangement is designed to engage on the at least one wear readjusting ring.

In this embodiment, the wear registering arrangement comprises at least one wear-registering section that extends away from the ring element and is designed to interact with the further component of the pressure plate subassembly.

A uniform interaction characteristic is obtained in this embodiment by arranging a plurality of wear-registering sections, preferably at least three thereof. As in the above embodiment, the uniform effect is best realized by arranging the wear-registering sections at equal spacings from each other in the circumferential direction.

When wear occurs, the at least one wear-registering section comes into bearing contact with the further component.

To prevent the wear readjusting device from making an undesired wear readjustment or compensation in a disengaged state of the clutch, that is to say a state in which the wear readjusting device is not loaded by the force store, the ring element includes a retaining arrangement frictionally and/or positively engaging the one component of the pressure plate subassembly.

For instance, for a symmetrical mode of action, the retaining arrangement may include a plurality of retaining sections, preferably at least three thereof, which engage a circumferential surface of the one component. Here, too, the uniform action about a circumference is best achieved when the individual retaining sections have a uniform circumferential spacing from each other.

The circumferential surface may be an external and/or internal peripheral surface of the one component of the pressure plate subassembly.

To prevent, in addition to the frictional or positive engagement, an undesired displacement of the ring element under the biasing force of the wear readjusting device, the external and/or internal circumferential surface tapers in relation to the axis of rotation in a direction that is opposite to a displacement direction of the ring element when wear occurs. The tapering of the surface occurs at least in the surface region cooperating with one of the retaining sections. Alternatively, the external and/or internal circumferential surface may be of essentially cylindrical design.

The clearance transmitter arrangement is designed particularly simply and cost effectively as a shaped sheet metal element. The ring element may be designed integrally together with the readjusting section or sections, the wear-registering section or sections, and/or the retaining section or sections.

In an embodiment that is particularly simple to construct and acts reliably, the one component of the pressure plate subassembly is the pressure plate.

The further component of the pressure plate subassembly may be, for example, the flywheel, the housing, and/or the force accumulator.

Furthermore, it is proposed that the ring element is secured about the axis of rotation to the component of the pressure plate subassembly or the at least one constructional element firmly connected to the component.

The present invention further relates to a clearance transmitter arrangement including a ring element, at least one wear-registering section designed integrally with the ring element to register any wear, at least one readjusting section designed integrally with the ring element to cooperate with a wear readjusting device, and at least one retaining section at least partly designed integrally with the ring element to retain the clearance transmitter arrangement frictionally and/or positively on a component of a pressure plate subassembly.

The present invention further relates to a motor vehicle friction clutch with automatic wear compensation including a pressure plate subassembly according to the invention.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings:

In the drawings, wherein like reference characters denote similar elements throughout the several views:

FIG. 7 is a perspective view of the clearance transmitter arrangement of the pressure plate subassembly of FIG. 6.

DETAILED DESCRIPTION OF THE PRESENTLY PREFERRED EMBODIMENTS

Figure 1:
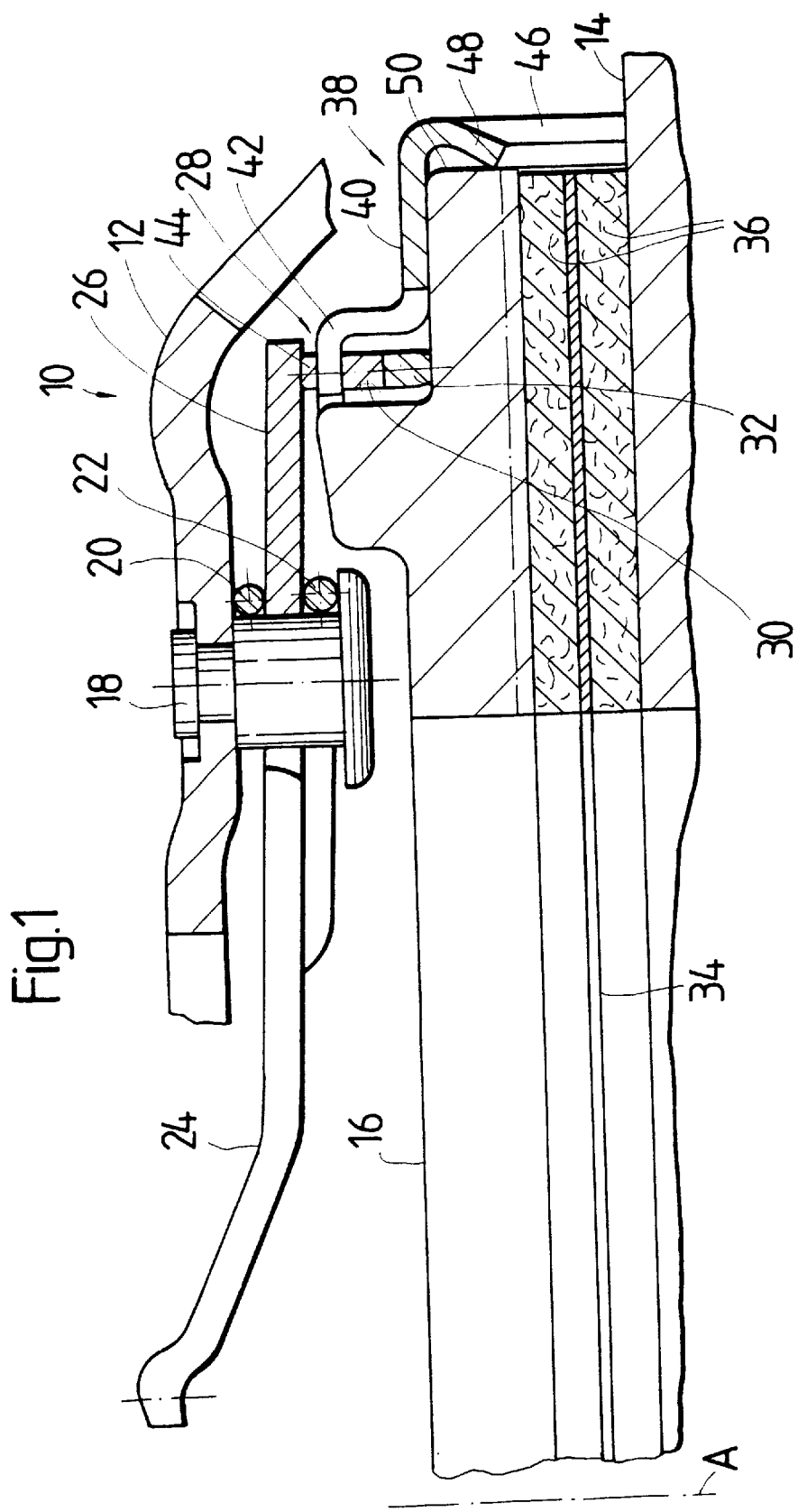
FIG. 1 is a simplified partial longitudinal sectional view of a pressure plate subassembly according to an embodiment of the present invention.

FIG. 1 shows a simplified view of a motor vehicle friction clutch with a pressure plate subassembly 10 according to an embodiment of the present invention. The pressure plate subassembly 10 comprises a housing 12 fixedly connected to a flywheel 14 in a radially outer region (not shown in FIG. 1). Housing 12 and flywheel 14 are jointly rotatable about an axis of rotation A. Arranged within the housing 12 is a pressure plate 16. A radially outer region of the pressure plate 16 is connected, for example, to the housing 12 in a rotationally fixed manner by so-called tangential leaf springs, but is axially displaceable with respect to the housing 12. A force accumulator in the form of a diaphragm spring 24 is supported on the housing 12 by a plurality of bolts 18 with the interposition of respective wire rings 20, 22. In the engaged state, the diaphragm spring 24 presses in a radially outer region 26 on a wear readjusting device 28.

The wear readjusting device 28 comprises two wear readjusting rings 30, 32. The wear readjusting ring 30 is loaded by the diaphragm spring 24, and the wear readjusting ring 32 is supported on the pressure plate 16. At their surface regions resting on each other, the readjusting rings 30, 32 have sawtooth profiles extending circumferentially. The inclined surfaces of the respective saw tooth profiles rest against each so that when the readjusting rings 30, 32 slide against each other in the circumferential direction, an enlargement of the axial extent of the wear readjusting device 28 results. Biasing springs (not illustrated in the figure), for example helical tension springs, engage on the readjusting ring 30 on the one hand and on the readjusting ring 32 on the other hand, and thus bias the wear readjusting rings 30, 32 for relative rotation in a wear readjusting direction.

A clutch disk 34 with friction linings 36 is located between the pressure plate 16 and the flywheel 14. The clutch disk 34 is clamped with its friction linings 36 between the pressure plate 16 and the flywheel 14 in the engaged state of the clutch.

Figure 2:
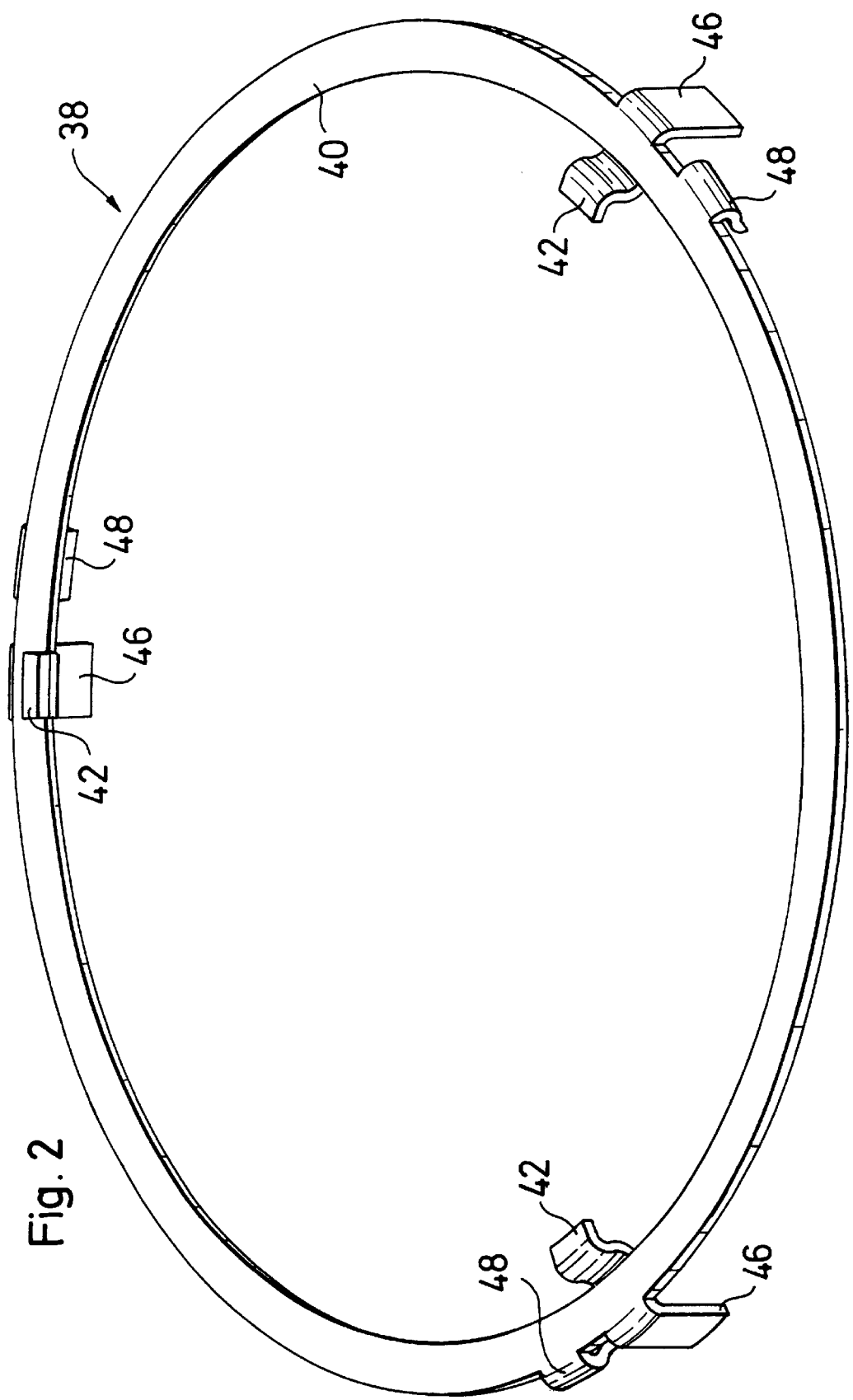
FIG. 2 is a perspective view of a clearance transmitter arrangement of the pressure plate subassembly of FIG. 1.
Figure 3:
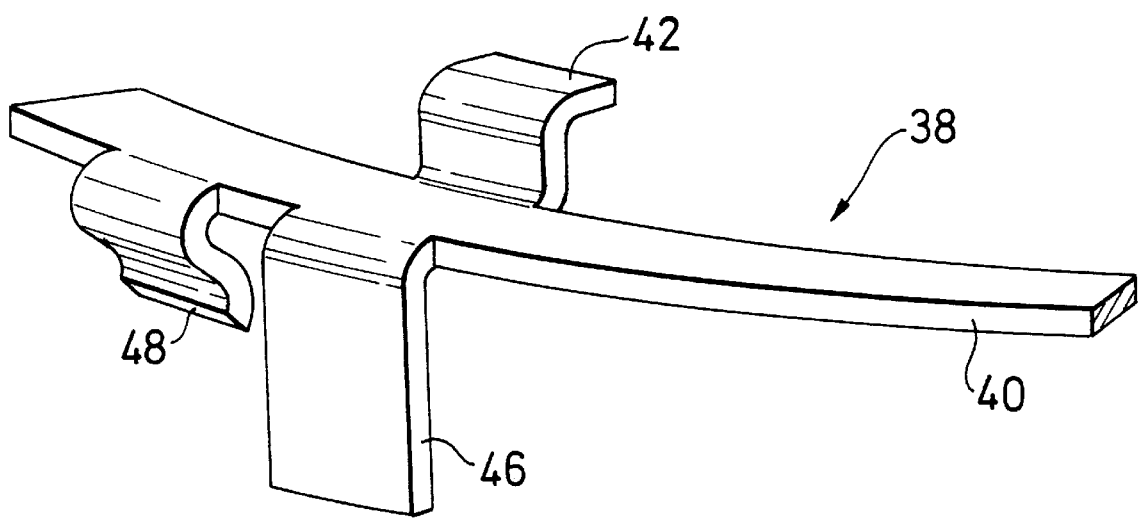
FIG. 3 shows an enlarged section of the clearance transmitter arrangement of FIG. 2.

Referring also to FIGS. 2 and 3, a clearance transmitter arrangement 38 comprises a ring element 40 which extends from a front face of the pressure plate 16 facing away from the flywheel 14 and surrounds the axis of rotation A. Three readjusting sections 42 are provided on the ring element 40 at the same spacing in the circumferential direction which engage behind the wear readjusting device 28 in a peripheral cutout 44 in the readjusting ring 30. Although three readjusting sections 42 are shown in FIGS. 1–3, two or more readjusting sections may be used.

Further provided in turn on the ring element 40 are three wear-registering sections 46, which extend radially outside the pressure plate 16, away from the ring element 40 located in a plane orthogonal to the axis of rotation A, and toward the flywheel 14. Since the ring element 40 is essentially arranged on a side of the pressure plate 16 facing away from the flywheel 14, a space-saving arrangement of the components is provided. However, the ring element 40 may also be arranged radially outside the pressure plate 16. Although three wear-registering sections are used in the embodiment of the invention shown in FIGS. 1–3, two or more wear-registering sections may be used.

Three retaining sections 48 are also provided on the ring element 40 which have a slightly curved form and rest under bias on an external peripheral surface 50 of the pressure plate 16. As depicted in FIG. 1, the external peripheral surface 50 is of essentially cylindrical design with respect to the axis of rotation A. Although three retaining sections are shown in the embodiment of FIGS. 1–3, two or more retaining sections may be used.

The function of the pressure plate subassembly according to the present invention in relation to wear compensation will now be described.

In an engaged and wear-free state of the clutch, the wear registering sections 46 have a slight spacing from the flywheel 14, or rest on the flywheel 14 without axial load. To move the clutch from the engaged state to a disengaged state, a radially inner section of the diaphragm spring 24 is moved toward the flywheel 14 so that the radially outer section 26 of the diaphragm spring 24 is moved away from the flywheel 14. When the clutch is disengaged, the pressure plate 16 may also move slightly away from the flywheel 14 after being released by the diaphragm spring 24 under the biasing effect of the tangential leaf springs. If no wear has occurred, the readjusting rings 30, 32 that are biased toward one another cannot rotate in relation to another because the clearance transmitter arrangement 38 is held frictionally on the pressure plate 16 by the retaining sections 48 and the wear-registering sections 46 engage in the cutouts 44 of the readjusting ring 30 and rest on that surface of the readjusting ring 30 that faces away from the pressure plate 16. This means that in this state no wear compensation takes place.

If wear of the friction linings 36 of the clutch disk 34 occurs, then in the engaged state the pressure plate 16 moves increasingly closer to the flywheel 14. In this process, the wear-registering sections 46 abut the flywheel 14 and thus blocks any movement of the clearance transmitter arrangement 38 in relation to the flywheel 14. Since the frictional force produced by the biasing action of the retaining sections 48 is distinctly lower than the axial thrust force produced by the biasing action of the diaphragm spring 24, the pressure plate 16 moves closer to the flywheel 14, given further wear of the friction linings 36, even if the wear-registering sections 46 are resting on the flywheel 14. This means that a relative displacement occurs between the clearance transmitter arrangement 38 and the pressure plate 16, during which displacement the clearance transmitter arrangement 38 is displaced, in relation to the pressure plate 16, in a direction moving away from the flywheel 14.

During this displacement, the readjusting sections 42 then lift off the surface of the readjusting ring 30. If, during a subsequent disengaging operation, the wear readjusting device 28 is released once more by the diaphragm spring 24, then there is initially no force present which counteracts the biasing force acting between the readjusting rings 30, 32, with the result that the readjusting rings 30, 32 rotate in relation to one another about the axis of rotation A and slide over one another with their complementary inclined sawtooth faces, thereby enlarging the axial extent of the wear readjusting device 28. Since the readjusting sections 42 engage in the cutouts 44, the readjusting ring 30 is held fast during this relative rotation, and only the wear readjusting ring 32 rotates.

This relative rotation of the wear readjusting rings 30, 32 is allowed to continue until the wear readjusting ring 30 once more rest against the readjusting sections 42. The relative rotation of the wear readjusting rings 30, 32 is stopped when the readjusting ring 30 abuts the readjusting sections 42 because the frictional force produced by the biasing action of the retaining sections 48 is designed to be greater than the axial thrust force of the wear readjusting rings 30, 32 that is produced by the biasing action of the springs acting between the readjusting springs 30, 32. The wear, which has been registered by the relative displacement between clearance transmitter arrangement 38 and pressure plate 16, on the basis of the abutment of the wear-registering sections 46, is then precisely compensated. The reduced axial extent of the friction linings 36 have been compensated by the enlarged axial extent of the wear readjusting device 28, with the result that the diaphragm spring 24 can once more operate in its optimum spring characteristic range.

In the pressure plate subassembly according to the invention, the clearance transmitter arrangement is designed with high symmetry in relation to the axis of rotation A. Therefore, centrifugal force components which act on the latter do not disturb the operating behavior. All the centrifugal force components acting on the clearance transmitter arrangement 38 compensate one another mutually. The individual wear-registering sections 46, readjusting sections 42 and retaining sections 48 are arranged with uniform peripheral spacings on the ring element 40. Therefore undesired tilting or a one sided action of force on the clearance transmitter arrangement 38 is avoided during operation.

FIGS. 1 to 3 show that the clearance transmitter arrangement 38 is an integrally designed part. That is, the ring element 40 is stamped out together with the wear-registering sections 46, the readjusting sections 42 and the retaining sections 48, from one sheet metal part, and the various sections are then bent into their desired form. The result of this is that, on the one hand, a very cost-effective construction is obtained and that, on the other hand, the operations required to assemble the pressure plate subassembly according to the invention are reduced.

Figure 4:
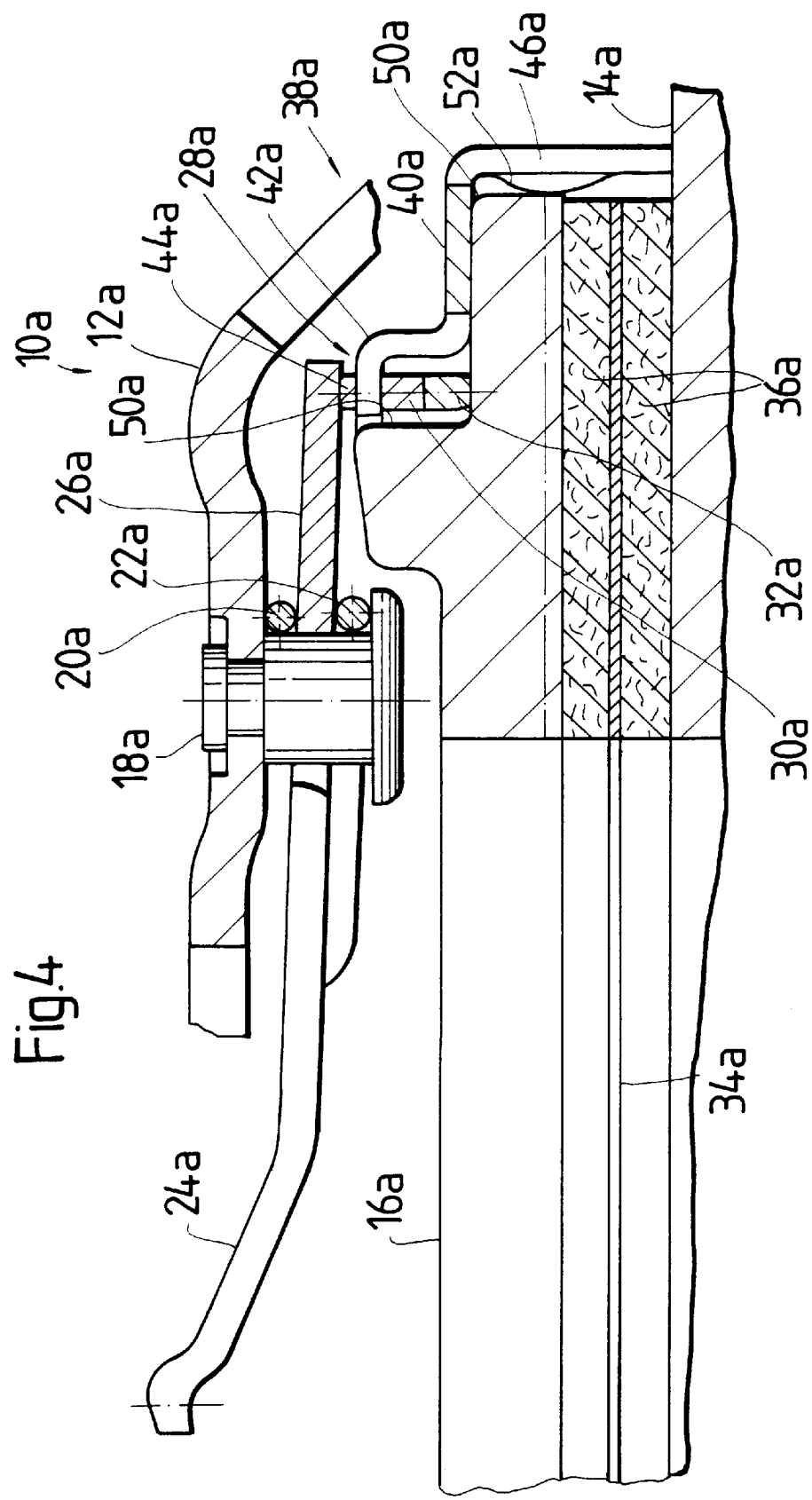
FIG. 4 is a partial longitudinal sectional view of another embodiment of the pressure plate subassembly of the present invention.

FIG. 4 shows another embodiment of the pressure plate subassembly according to FIGS. 1 to 3. Components which correspond with respect to their construction or their function to the components shown in FIG. 1 are designated by the same reference symbols, with the addition of a suffix "a". Only the constructional differences from the configuration described previously will be discussed below.

The embodiment shown in FIG. 4 does not include separate sections corresponding to the retaining sections 48 of FIG. 1. Instead, wear-registering sections 46a include spring elements 52a, for example leaf-spring elements supported at one end with their end sections on the wear-registering sections 46a and at the other end on the external peripheral surface 50a of the pressure plate. As a result of the biasing action of the spring elements 52a, once more the frictional contact or guidance of the clearance transmitter arrangement 38a is produced on the pressure plate 16a. The individual spring elements 52a are preferably fixed in their end regions to the wear-registering sections 46a. Since the wear-registering sections 46a are arranged with equal spacings from one another in the peripheral direction, it is advantageous if such a spring element 52a is provided in the case of each of the wear-registering sections, so that a symmetrical fixing or self-centering of the clearance transmitter arrangement 38a is provided.

The embodiment of FIG. 4 is particularly advantageous because if the ringed element is required to be fairly thick for reasons of stability the retaining elements 48 of the embodiment shown in FIGS. 1–3 are very stiff and may provide too much force so that the desired displaceability of the pressure plate with respect to the clearance transmitter arrangement, when wear occurs, is no longer ensured. In such a case, the desired readjusting behavior can be achieved by suitable selection of the spring characteristic of the spring elements 52a, without the clearance transmitter arrangement having to be produced from particularly thin metal sheet.

Figure 5:
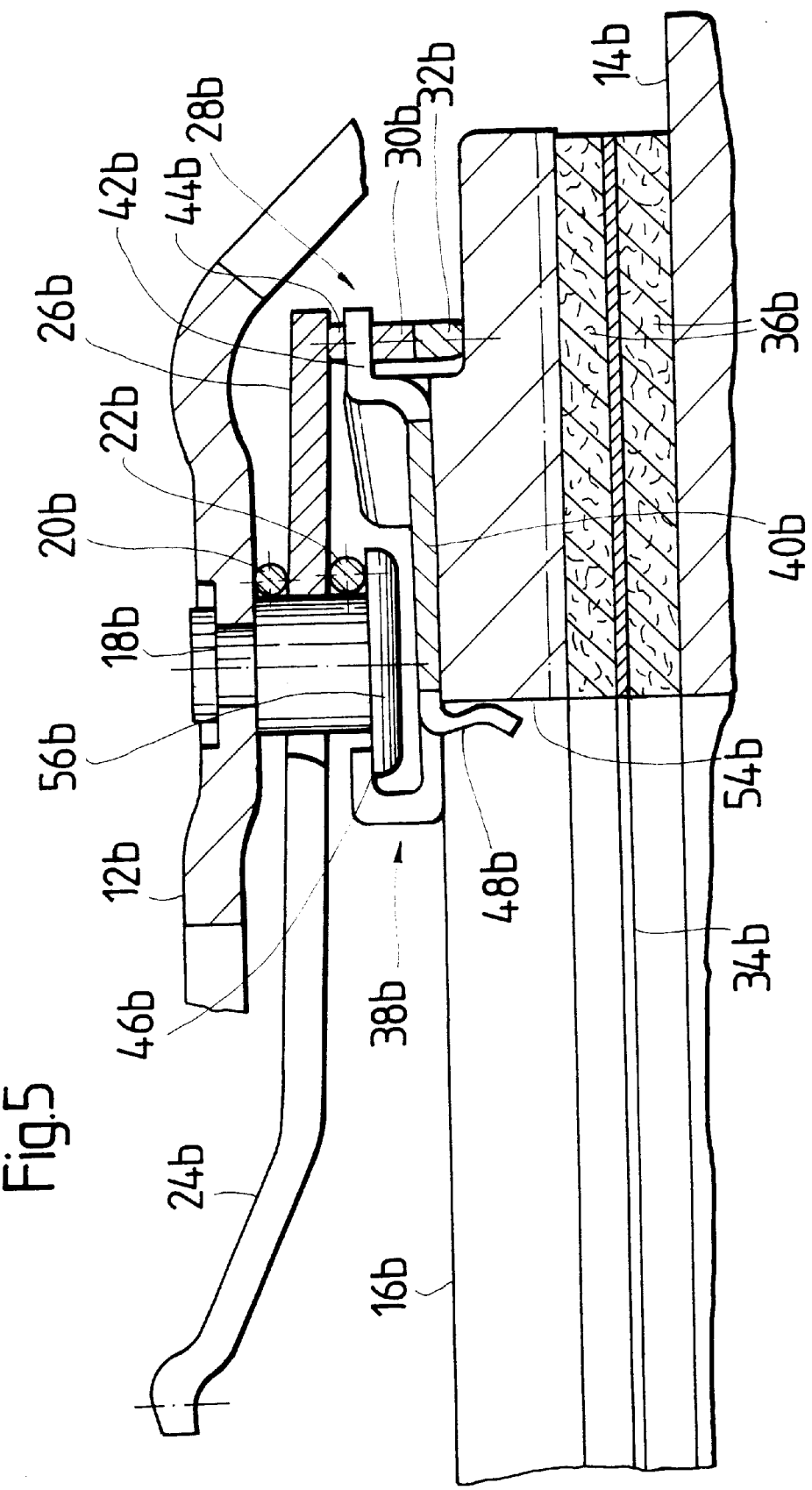
FIG. 5 is a partial longitudinal sectional view of yet another embodiment of the pressure plate subassembly of the present invention.

FIG. 5 shows a further embodiment of the pressure plate assembly according to FIG. 1. Components which correspond, with respect to their function or their construction, to components of the configuration according to FIGS. 1 to 3, are designated by the same reference symbol and the addition of a suffix "b". Once more, only the constructional and functional differences in relation to the embodiment according to FIGS. 1 to 3 will be discussed below.

In FIG. 5 the retaining sections 48b proceeding from the ring element 40b do not engage on an external circumferential surface but on an essentially cylindrical internal circumferential surface 54b of the pressure plate 16b. Since a plurality of retaining sections 48b are distributed circumferentially, the self-centering of the clearance transmitter arrangement 38b is produced and the desired pressing force of the retaining sections 48b on the internal peripheral surface 54b is produced.

Another difference is that the wear-registering sections 46b are bent toward the diaphragm spring 24b and engage a side of a head 56b on a retaining bolt 18b facing away from the pressure plate 16b. The retaining bolts 18b are fixed to the housing 12b for holding the diaphragm spring 24b. It can be seen that, as a result of the fixed connection of the housing 12b to the flywheel 14b, a fixed positional association is also provided between the flywheel 14b and the head or the heads 56b of the bolts 18b. This means that the axial displacement of the pressure plate 16b toward the flywheel 14b caused by wear of the friction linings 36b, can likewise be registered by the wear-registering sections 46b coming to rest on or striking the heads 56b. The wear registering sections 46b are bent essentially in a U shape in this embodiment. When the wear-registering sections 46b abut the heads 56b, the clearance transmitter arrangement 38b is prevented from moving toward the flywheel 14b at the same time as the pressure plate 16b. Therefore, as in the previous embodiments, the readjusting sections 42b once more lift off from the readjusting ring 30b. The way in which it functions in relation to wear compensation in this configuration is therefore also as previously described with reference to FIGS. 1 to 3.

Figure 6:
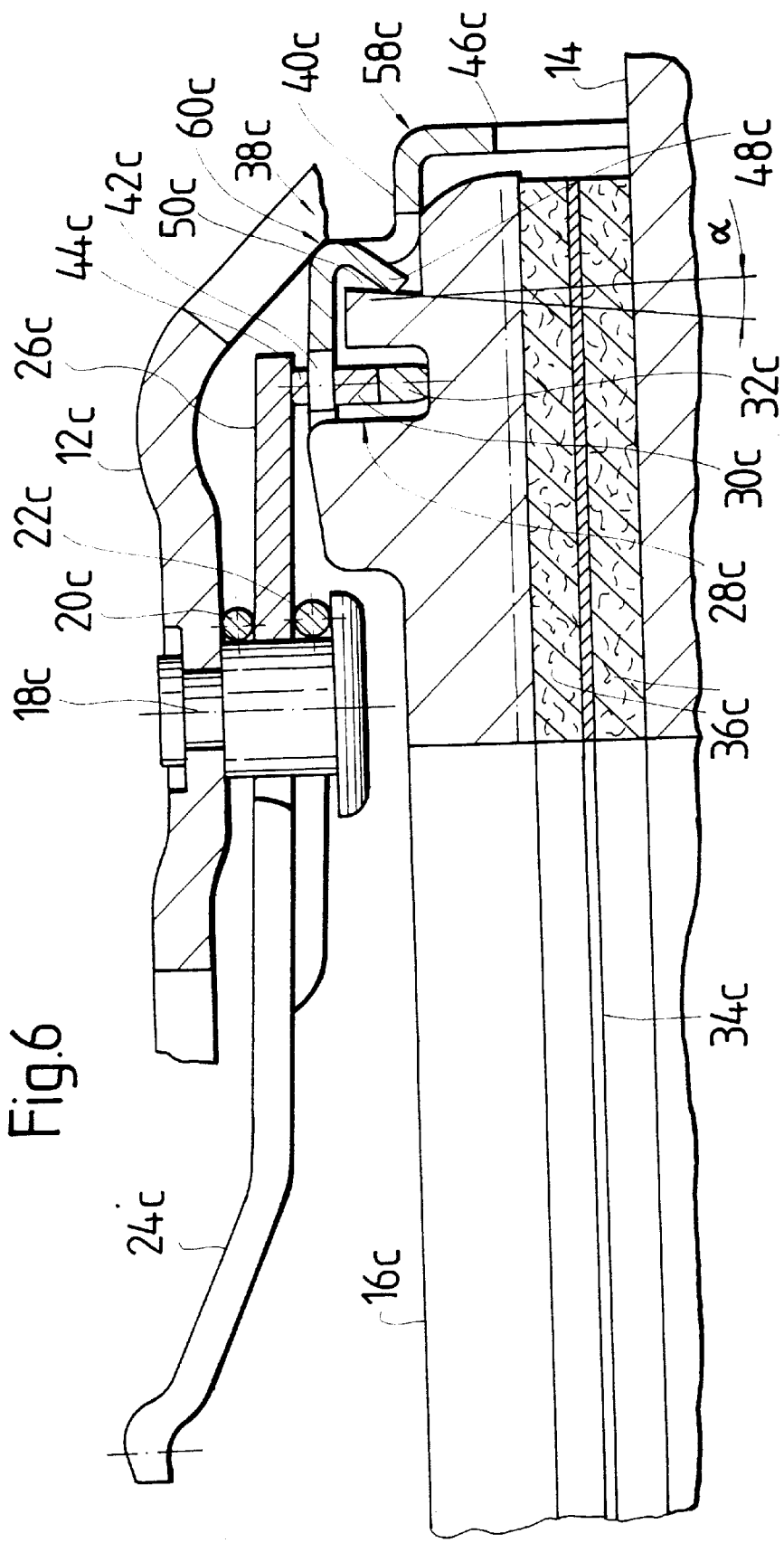
FIG. 6 is a partial longitudinal sectional view of a further embodiment of the pressure plate subassembly of the present invention.

FIGS. 6 and 7 show a further alternative embodiment of the pressure plate subassembly according to the invention. Components which correspond with respect to construction or function to components previously described with reference to FIGS. 1 to 3 are described using the same reference symbols with the addition of a suffix "c". The constructional and functional differences from the previously described configuration will be discussed below.

In the embodiments of FIGS. 6 and 7, the clearance transmitter arrangement 38c in the region of the ring element 40c is not designed as a smooth or flat ring, as has been shown in the previous configurations, but has step-like contouring. Starting from this step-like contouring, the wear-registering sections 46c and the readjusting sections 42c extend axially. The wear-registering sections 46c extend from a lower step section 58c of the ring element 40c, essentially axially toward the flywheel 14, and the readjusting sections 42c extend from an upper step section 60c, essentially radially away from the flywheel 14. The step sections 58c, 60c lead to a stiffening of the overall clearance transmitter arrangement 38c so that it can in turn be designed integrally with the retaining sections 48c bent out in the transition region between the step sections 58c, 60c. Because the step configuration increases the strength of the clearance transmitter arrangement 38c, a thinner material may be used which prevents the retaining force of the retaining sections 48c from becoming too great because of an excessively high spring stiffness.

It can also be seen in FIG. 6 that the external peripheral surface 50c of the pressure plate 60 is not of cylindrical design here, but is designed so as to taper toward the flywheel 14. A cone angle with reference to the axis of rotation may lie, for example, within the range from 2° to 15°. This has the advantage that, in addition to the frictional engagement of the retaining sections 48c on the pressure plate 16c, a kind of positive action is present, which counteracts an undesired displacement of the clearance transmitter arrangement 38c and thus an undesired wear compensation.

It is emphasized that the various specific features of the configurations described above can be combined with one another. Thus, for example, in the embodiment of FIGS. 6 and 7, the clearance transmitter arrangement 38c may be designed so that it engages on a radially inner circumferential surface of the pressure plate 16c. Similarly, the individual retaining sections 48c may be designed as separate parts, which are fixed or arranged on the ring element 40c or sections connected to the latter.

In the various configurations, the interaction of the wear-registering sections with respectively different components is also possible. Thus, the cooperation of the wear-registering sections 46, 46a, 46b, 46c with the bolts 18c or 18a may also be provided in the embodiment of FIG. 6 or FIG. 4. Furthermore, the wear-registering sections may interact with other components of the pressure plate subassembly, for example the diaphragm spring, to register the wear, that is to say to strike these or to be loaded by these when wear occurs.

The wear readjusting device may also be arranged in the region between the diaphragm spring and housing, so that when wear occurs the entire diaphragm spring is displaced together with the pressure plate. By this means, too, a constant spring characteristic is ensured. In this embodiment, the clearance transmitter arrangement is then retained and guided on the housing or constructional parts firmly connected to the latter. The wear is registered, for example, by the relative displacement between clearance transmitter arrangement and pressure plate.

In addition, it is emphasized that the wear readjusting device is not restricted to the illustrated embodiments. For instance, the readjusting device may comprise a single readjusting ring, which slides with its oblique faces on complementary oblique faces of the pressure plate or of the diaphragm spring and, as a result, compensates for the wear that has occurred. Separate readjusting elements, for example readjusting wedges or the like, may be provided in association with each of the readjusting sections.

The clearance transmitter may be constructed of various materials such for example, as sheet metal, plastic or the like. The clearance transmitter constructed of sheet metal being preferred because of the low costs and the ability to be worked easily.

In addition, all or some of the wear-registering sections, readjusting sections, and/or retaining sections may comprise separate constructional parts that are firmly connected to the ring element by welding, soldering, riveting or the like, instead of being formed integrally with the ring element. In addition, the readjusting sections may comprise resiliently springy material, so that a force equilibrium is established as a result of the axial loading by the wear readjusting device. If a displacement of the clearance transmitter arrangement with respect to the wear readjusting device occurs, produced as a result of wear, then the elastically deformable readjusting sections will be relieved and, during a subsequent disengaging operation, the wear readjusting device can compensate for the wear until a force equilibrium has been established once more between the biasing force of the wear readjusting device and the deformation force of the readjusting sections.

In addition to the frictional engagement of the individual retaining sections or the spring elements on the pressure plate or on a corresponding component, a positive engagement may also be produced as a result of groove-like profiling of the appropriate circumferential surface and, if necessary, of the retaining sections, so that the individual retaining sections can engage in these grooves or this profiling of the circumferential surface.

In the case of all the configurations illustrated, the ring element may be secured on the component on which it is axially displaceably guided against rotation in the circumferential direction with respect to this component. In the drawings, the component on which the ring element is axially displaceable is the pressure plate. The securing of the ring element may be provided by the retaining sections that are supported on the component, that is to say the pressure plate, engaging in axially extending grooves, with the result that although they are axially displaceable, they are secured against rotation in the circumferential direction. In this optional embodiment, the readjusting ring cooperating with the diaphragm spring may also be secured against rotation by the ring element so that only the readjusting ring which is supported on the pressure plate rotates during a readjusting operation. In the same way, the readjusting ring may also be secured against rotation by engagement with the ring element.

In addition, it is emphasized that the number of respective sections proceeding from the ring element may be arbitrarily selected, but at least two sections should be provided, so that inadvertent tilting of the ring element and any impairment produced thereby of the readjusting behavior is avoided. In any case, a symmetrical arrangement around the axis of rotation is preferred, so that a correspondingly symmetrical action characteristic is obtained. Although, the number of respective wear-registering sections, readjusting sections, and retaining sections is equal in the illustrated embodiments, this is not required.

The invention is not limited by the embodiments described above which are presented as examples only but can be modified in various ways within the scope of protection defined by the appended patent claims.

I claim:

1. A pressure plate subassembly for urging a clutch disk against a flywheel in a friction clutch with automatic wear compensation, said pressure plate subassembly comprising a plurality of components including:

a housing connectable with the flywheel of the friction clutch for joint rotation about an axis of rotation;

a pressure plate rotatably mounted in said housing for rotating about said axis of rotation relative to said housing and being axially displaceable relative to said housing;

an accumulator operatively supportably arranged between said housing and said pressure plate for urging said pressure plate toward a side of said housing that is connectable to the flywheel;

a wear readjusting device arranged between said accumulator and said pressure plate comprising a readjusting element displaceable for compensating for wear of the clutch disk of the friction clutch; and a clearance transmitter arrangement having a readjusting arrangement operatively connected for cooperating with said wear readjusting device, said clearance transmitter arrangement further comprising a ring element encircling the axis of rotation and engaging one of said plural components including a wear-registering arrangement interactable with one of another of said plural components and the flywheel of the friction clutch for registering the wear of said clutch disk, wherein said ring element is axially displaceable with respect to said one of said plural components and said readjusting arrangement is mounted on the ring element and is operatively connected with said wear readjusting device for permitting displacement of said readjusting element in response to the wear of the clutch disk, and wherein said wear-registering arrangement comprises a plurality of wear-registering sections.

2. The pressure plate assembly of claim 1, wherein said readjusting arrangement of said ring element comprises at least one readjusting section extending axially away from said ring element and engaging said wear readjusting device.

3. The pressure plate subassembly of claim 2, wherein said at least one readjusting section comprises a plurality of readjusting sections.

4. The pressure plate subassembly of claim 3, wherein said plural readjusting sections are equally spaced on said ring element in a circumferential direction with respect to said axis of rotation.

5. The pressure plate subassembly of claim 2, wherein said wear readjusting device comprises a readjusting ring, said at least one readjusting section of said ring element engages said readjusting ring.

6. The pressure plate subassembly of claim 1, wherein said plural wear-registering sections are equally spaced in a circumferential direction with respect to said axis of rotation.

7. The pressure plate subassembly of claim 1, wherein said plural wear-registering sections are contactable with said one of said another of said plural components and the flywheel of the friction in response to the wear of the clutch disk.

8. The pressure plate subassembly of claim 1, wherein said ring element further comprises a retaining arrangement engaging said one of said plural components.

9. The pressure plate subassembly of claim 8, wherein said retaining arrangement comprises a plurality of retaining sections engaging a circumferential surface of said one of said plural components.

10. The pressure plate subassembly of claim 9, wherein said retaining sections are uniformly spaced on said ring element in a circumferential direction about said axis of rotation.

11. The pressure plate subassembly of claim 9, wherein said circumferential surface comprises one of an external circumferential surface and an internal circumferential surface of said pressure plate.

12. The pressure plate subassembly of claim 11, wherein said circumferential surface comprises one of a cylindrical surface and a surface tapering toward a direction opposing a displacement direction of said ring element in response to the wear of the clutch disk.

13. The pressure plate subassembly of claim 1, wherein said clearance transmitter arrangement comprises a sheet metal element.

14. The pressure plate subassembly of claim 1, wherein said one of said plural components comprises said pressure plate assembly.

15. The pressure plate subassembly of claim 14, wherein said housing comprises a support for said accumulator and said another one of said plural components comprises one of said housing, said support, and a constructional unit connected to said housing.

16. The pressure plate subassembly of claim 1, wherein said ring element is rotatably fixedly connected to said one of said plural components.

17. A clearance transmitter arrangement for use in a friction clutch having a plurality of components arranged for rotation about an axis of rotation including a flywheel, a clutch disk, a pressure plate subassembly with a pressure plate, a housing, and a force accumulator mounted between the housing and the pressure plate so that the pressure plate urges the clutch disk against the flywheel, and a wear readjusting device for compensating for wear of the clutch disk, said clearance transmitter arrangement comprising:

a ring element axially movably mountable on one of the plural components of pressure plate subassembly so that said ring element encircles the axis of rotation of the friction clutch;

a retaining section mounted on said ring element and engagable with the one of the plural components for retaining said ring element on the one of the plural components;

a wear registering arrangement comprising at least two wear registering sections mounted on said ring element and interactable with the friction clutch for registering wear of the clutch disk;

a readjusting section mounted on said ring element interactable with the wear readjusting device of the friction clutch for permitting a readjustment operation of the wear readjustment device in response to a registration of wear by said wear registering arrangement.

18. The clearance transmitter arrangement of claim 17, wherein said retaining section comprises at least two retaining sections.

19. The clearance transmitter arrangement of claim 18, wherein said at least two retaining sections are uniformly arranged with respect to a circumferential direction.

20. The clearance transmitter arrangement of claim 17, wherein said retaining section is formed integrally with said ring element.

21. The clearance transmitter arrangement of claim 17, wherein said at least two wear registering sections are uniformly arranged with respect to a circumferential direction.

22. The clearance transmitter arrangement of claim 17, wherein said wear registering arrangement is formed integrally with said ring element.

23. The clearance transmitter arrangement of claim 19, wherein said readjusting section comprises at least two retaining sections.

24. The clearance transmitter arrangement of claim 23, wherein said at least two readjusting sections are uniformly arranged with respect to a circumferential direction.

25. The clearance transmitter arrangement of claim 17, wherein said readjusting section is formed integrally with said ring element.

26. The clearance transmitter arrangement of claim 17, wherein each said retaining section, said readjusting section, and said wear registering arrangement is formed as an integral part with said ring element.

27. A friction clutch, comprising:

a flywheel rotatable about an axis of rotation;

a clutch disk rotatable with respect to said flywheel about said axis of rotation; and a pressure plate subassembly comprising a plurality of components including a housing having a radially outer end connected to said flywheel for joint rotation with said flywheel, a pressure plate between said housing and said clutch disk, a force accumulator connected between said pressure plate and said clutch disk for urging said pressure plate toward said clutch disk thereby clamping said clutch disk between said pressure plate and said flywheel, and a wear readjusting arrangement connected between said force accumulator and said pressure plate for compensating for wear of said clutch plate;

said pressure plate subassembly further comprising a clearance transmitter including a ring element axially movably mounted on one of said plural components of pressure plate subassembly and encircling said axis of rotation, a retaining section mounted on said ring element and engagable with said one of said plural components for retaining said ring element on said one of said plural components, a wear registering arrangement comprising at least two wear registering sections mounted on said ring element and interactable with one of another component of said pressure plate subassembly and said flywheel for registering wear of the clutch disk, and a readjusting section mounted on said ring element interactable with said wear readjusting device of said friction clutch for permitting a readjustment operation of the wear readjustment device in response to a registration of wear by said wear registering arrangement.

28. The friction clutch of claim 27, wherein said retaining section comprises at least two retaining sections.

29. The friction clutch of claim 28, wherein said at least two retaining sections are uniformly arranged with respect to a circumferential direction.

30. The friction clutch of claim 27, wherein said retaining section is formed integrally with said ring element.

31. The friction clutch of claim 27, wherein said at least two wear registering sections are uniformly arranged with respect to a circumferential direction.

32. The friction clutch of claim 27, wherein said wear registering arrangement is formed integrally with said ring element.

33. The friction clutch of claim 27, wherein said readjusting section comprises at least two retaining sections.

34. The friction clutch of claim 33, wherein said at least two readjusting sections are uniformly arranged with respect to a circumferential direction.

35. The friction clutch of claim 27, wherein said readjusting section is formed integrally with said ring element.

36. The friction clutch of claim 27, wherein each said retaining section, said readjusting section, and said wear registering arrangement is formed as an integral part with said ring element.

* * * * *